(12) United States Patent
Wright et al.

(10) Patent No.: US 7,797,219 B1
(45) Date of Patent: Sep. 14, 2010

(54) METHOD AND SYSTEM TO DETERMINE MILITARY BENEFITS

(75) Inventors: Richard L. Wright, San Antonio, TX (US); Michael Rothe, Hondo, TX (US); Dana N. Hunt, Fair Oaks Ranch, TX (US); Bob McDonald, Mountain Top, PA (US)

(73) Assignee: United Services Automobile Association, San Antonio, TX (US)

( * ) Notice: Subject to any disclaimer, the term of this patent is extended or adjusted under 35 U.S.C. 154(b) by 240 days.

(21) Appl. No.: 11/584,416

(22) Filed: Oct. 19, 2006

(51) Int. Cl.
*G06Q 40/00* (2006.01)

(52) U.S. Cl. .................... 705/36 R; 705/37

(58) Field of Classification Search ............ 705/7, 705/36, 36 R–37
See application file for complete search history.

(56) References Cited

U.S. PATENT DOCUMENTS

| | | | |
|---|---|---|---|
| 5,523,942 | A | 6/1996 | Tyler et al. |
| 6,253,192 | B1 | 6/2001 | Corlett et al. |
| 2003/0187768 | A1 | 10/2003 | Ryan et al. |
| 2006/0241989 | A1* | 10/2006 | Walters et al. ............ 705/7 |
| 2007/0038487 | A1* | 2/2007 | McCarthy .................. 705/4 |

OTHER PUBLICATIONS

"Life Insurance Calculator", http://www.forbes.com/tools/calculator/life_insurance.jhtml, (2006),3 p.
"Life Insurance Needs Calculator", http://www.finaid.org/calculators/lifeinsuranceneeds.phtml, (2006),2 p.
"Military Student Aid", http://www.finaid.org/military/, (2006),2 p.
"Understanding and Controlling Your Finances: Life Insurance Calculator", http://www.bygpub.com/finance/LifeInsCalc.htm, (1997),3 p.

* cited by examiner

*Primary Examiner*—Thu Thao Havan
(74) *Attorney, Agent, or Firm*—Chadbourne & Parke, LLP; Walter G. Hanchuk

(57) ABSTRACT

A method, apparatus and system to performing an adjustment to an overall financial goal based on military benefits. The user data may include user information on a number of users. The military data may include military information on a number of military users among the number of users. The military information may include a branch of service, a military rank, a military activity status, a service start date, and a service component. The lookup data may include assumption information used. A financial goal assessment application may receive information from the user data, the military data, and the lookup data and to generate a financial goal assessment for at least one of a user or a spouse of the user.

21 Claims, 15 Drawing Sheets

METHOD AND SYSTEM TO DETERMINE MILITARY BENEFITS

CROSS REFERENCES

This application is related to U.S. application Ser. No. 11/551,091 titled LIFE INSURANCE NEEDS ASSESSMENT SYSTEMS AND METHODS filed on even date herewith; and is related to U.S. application Ser. No. 11/584,419 titled METHOD AND SYSTEM TO DETERMINE MILITARY BENEFITS filed on even date herewith; and is related to U.S. application Ser. No. 11/584,307 titled METHOD AND SYSTEM TO DETERMINE MILITARY BENEFITS filed on even date herewith; all of which are incorporated herein by reference.

TECHNICAL FIELD

This application relates to a method and system to determine military benefits and more particularly to an automated system for generating military benefit information for use by applications.

BACKGROUND

A user may seek to determine a desired insurance goal to cover a potential occurrence of one or more life events. An assessment calculator may request a number of pages containing a number of fields to be completed with data provided by the user to make a calculation to determine a desired insurance need to cover the potential occurrence.

SUMMARY

In an example embodiment, a system for a performing an adjustment to an overall financial goal based on military benefits is described. The user data may include user information on a number of users. The military data may include military information on a number of military users among the number of users. The military information may include a branch of service, a military rank, a military activity status, a service start date, and a service component. The lookup data may include assumption information used. A financial goal assessment application may receive information from the user data, the military data, and the lookup data and to generate a financial goal assessment for at least one of a user or a spouse of the user.

In an example embodiment, a method for performing for a performing an adjustment to an overall financial goal is described. One or more fields of a user interface are pre-filled with user information. A retirement military pension is calculated from user information of a user. A financial goal of the user is offset by the calculated military retirement pension.

In an example embodiment, a method for performing an adjustment to an overall financial goal based on military benefits is described. An active duty military adjustment to an insurance amount is processed when a user is serving on active duty and is not serving as a guard officer or a reserve officer. A guard/reserves adjustment to the insurance amount is processed when the user is serving on active duty and is serving as a guard officer or a reserve officer. A retired active duty adjustment to the insurance amount is processed when the user is retired military and did not serve as a guard officer or a reserve officer. A retired guard/reserves adjustment to the insurance amount is processed when the user is retired military and served as a guard officer or a reserve officer.

BRIEF DESCRIPTION OF DRAWINGS

Embodiments are illustrated by way of example and not limitation in the figures of the accompanying drawings, in which like references indicate similar elements and in which.

DETAILED DESCRIPTION

In the following detailed description of example embodiments, reference is made to the accompanying drawings, which form a part hereof, and in which is shown, by way of illustration, specific embodiments in which the example method, apparatus, and system may be practiced. It is to be understood that other embodiments may be utilized and structural changes may be made without departing from the scope of this invention.

Figure 1:
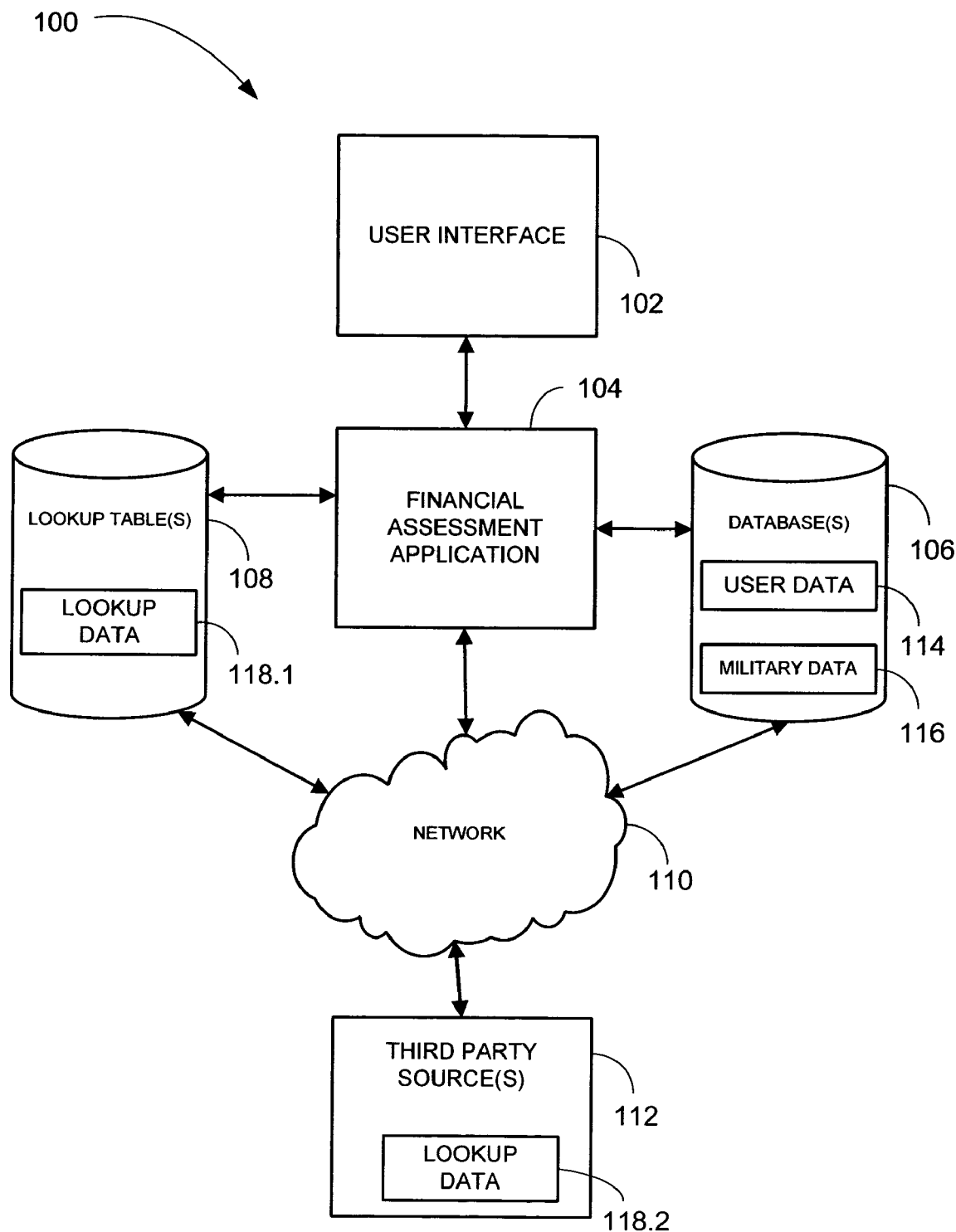
FIG. 1 is a block diagram of a system to perform a financial goal assessment according to an example embodiment.

Referring to FIG. 1, a system 100 to perform a financial goal assessment according to an example embodiment is illustrated. A financial goal assessment application 104 may receive information (e.g., data) from a user interface 102 and from one or more databases 106, one or more lookup tables 108, and one or more third party sources 112 to generate a financial goal assessment (e.g., determine supplemental income to achieve a financial goal) for a user and optionally the spouse of the user. For example, the financial goal may be a residual amount not met by pensions.

In an example embodiment, the financial goal assessment application may perform an adjustment to an overall financial goal based on military benefits (e.g., a financial goal of the user may be satisfied in part by the calculated military retirement pension). For example, an adjustment may be made depending on a service status or history of a user in question.

A user may utilize the user interface 102 to manually provide information to the financial goal assessment application 104, alter information retrieved from the one or more databases 106, the one or more lookup tables 108, and the one or more third party sources 112, and/or receive results from the financial goal assessment application 104. An example embodiment of the user interface 102 and the financial goal assessment application 104 are described in greater detail below.

The database 106 may be accessed by the financial goal assessment application 104 locally and/or over the network 110. The database 106 may include the user data 114 and the military data 116 that may be retrieved by the financial goal assessment application 104. In an example embodiment, the user data 114 may include user information on a number of users of the system 100 and the military data 116 may include military information on a number of military users among the number of users.

The financial goal assessment application 104 may access lookup data 118.1, 118.2 respectively from the lookup table 108 and/or the third party sources 112.

In an example embodiment, the financial goal assessment application 104 may retrieve available information regarding the user and optionally a spouse of the user from user data 114, the military data 116 and/or the lookup data 118 and may pre-fill one or more fields of the user interface 102 with information that may subsequently be modifiable by the user. For example, the information may be obtained data from the user data 114, the military data 116 and/or the lookup data 118 and/or derived data from the user data 114, the military data 116 and/or the lookup data 118.

The financial goal assessment application 104 may include an insurance assessment application to determine an amount of insurance (e.g., an insurance amount) that a user may seek to have to meet certain financial goals (e.g., obligations) upon the death of the user and/or a spouse. For example, the financial goal assessment application 104 may determine an amount of insurance that may be purchased to replace current income of the user and optionally the spouse after retirement and, if not already retired, pre-retirement. It may be appreciated that the financial goal assessment application may be used for other financial determinations beyond insurance.

In an example embodiment, the financial goal assessment application 104 may utilize the lookup data 118 to obtain assumption information for a number of assumptions (e.g., estimations) when determining one or more insurance amounts for the user and optionally the spouse. For example, the lookup data 118 may include data from third party sources retrieved at a time of need and/or has been previously obtained and used in determinations herein. The user data defines or estimates one or more of a multiplicity of possible parameters to a user's financial plan such as a rate of inflation, a college inflation rate, an average return on investment, and the like. By way of example, the multiplicity of possible parameters may include an inflation rate based on the consumer price index (CPD) of 2.5%, an average college inflation rate that may be based on the inflation rate plus 3%, the return on investment prior to retirement that may be based on the inflation rate plus 4%, the return on investment in retirement that may be based on the inflation rate plus 3%, a non-military pension (when applicable) that may be estimated to be 30% of earned income at retirement, the age of retirement may be 62 years old, final expenses including medial costs and burial may be estimated to be $25,000, an emergency fund may be based on 6 months of income, and children may be considered adults at age 18. However, different values for the lookup data 118 may also be used. In an example embodiment, the lookup data 118 used by the financial goal assessment application 104 may be (or may not be) modifiable by the user.

In an example embodiment, the lookup data 118 may include department of defense pay tables, social security benefit information, and the like. In an example embodiment, it may be appreciated that the use of the lookup data 118 by the financial goal assessment application 104 may simplify calculations performed by the financial goal assessment application 104 and/or may reduce an amount of user input provided by the user through the user interface 102 to perform a financial goal assessment.

Figure 2:
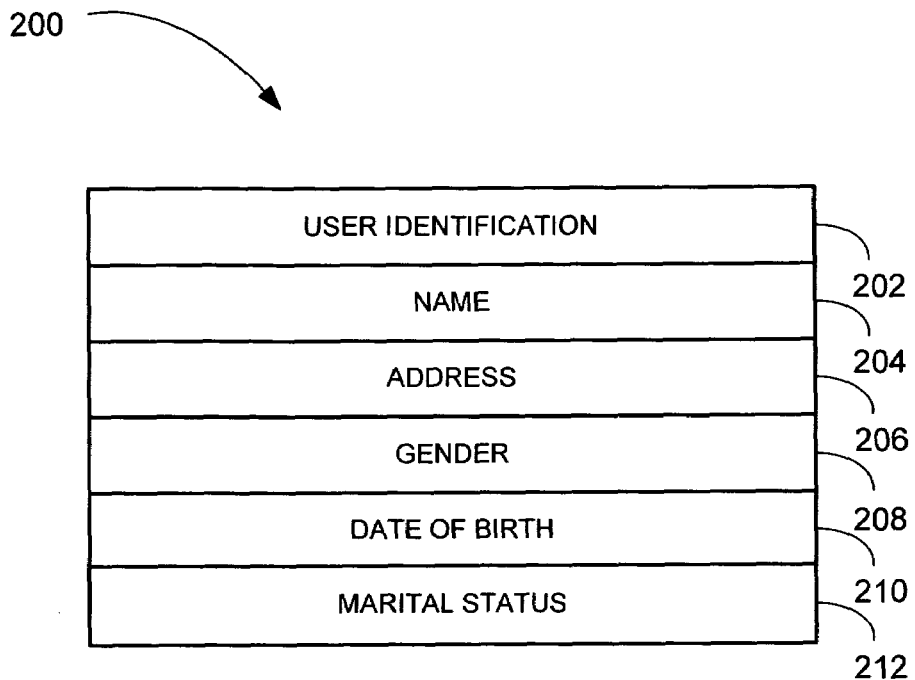
FIG. 2 is a block diagram of user data structure according to an example embodiment.

Referring to FIG. 2, a user data structure 200 in accordance with an example embodiment is illustrated. In an example embodiment, the user data 114 (see FIG. 1) may include a plurality of user data structures 200 (e.g., the user information of a user may be the form of the user data structure 200). In an example embodiment, the user data structure 200 may retain user information of a single user of the financial goal assessment application 104 (see FIG. 1).

The user data structure 200 may include an optional user identification field 202, a name field 204, an address field 206, a gender field 208, a date of birth field 210, and a marital status field 212.

The user identification field 202 is used to identify a user. For example, a unique identification (e.g., a user number) within the user identification field 202 may enable a user to be identified among the plurality of users from within the database 106 (see FIG. 1).

The name field 204 retains a name of the user, the address field 206 retains an address of the user, the gender field 208 indicates a gender (e.g., male or female) of the user, the date of birth field 210 retains a date of birth of the user and/or age of the user, and the marital status field 212 indicates whether the user is married. For example, the marital status field 212 may have values including single, married, divorced, separated, widowed, and the like.

Figure 3:
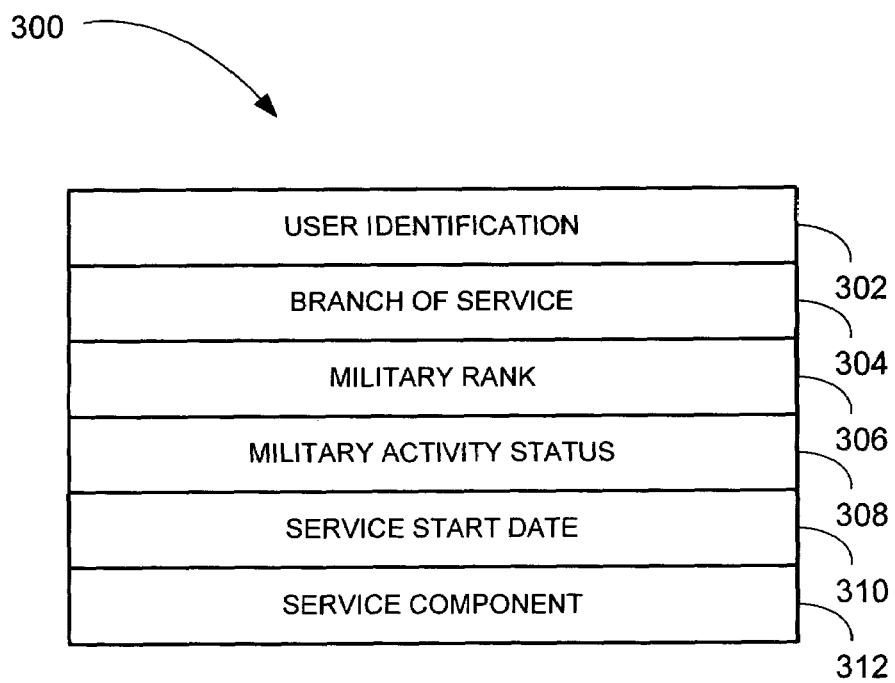
FIG. 3 is a block diagram of military data structure according to an example embodiment.

Referring to FIG. 3, a military service data structure 300 in accordance with an example embodiment is illustrated. In an example embodiment, the military data 116 (see FIG. 1) may include a plurality of military service data structures 300 (e.g., the military information of a user may be the form of the military service data structure 300). For example, the military service data structure 300 may retain user information of a single user of the financial goal assessment application 104 (see FIG. 1).

The military service data structure 300 may include a user identification field 302, a branch of service field 304, a military rank field 306, a military activity status field 308, a service date field 310, and a service component field 312.

The user identification field 302 is used to identify a user. For example, a unique identification (e.g., a user number) within the user identification field 302 may enable a user to be identified among the plurality of users from within the military data 116 (see FIG. 1).

In an example embodiment, the user identification field 302 may be used to match the military service data structure 300 of a user to the user data structure 200 of the same user through the user identification field 202 (see FIG. 2). For example, the user identification fields 202, 302 may be matched through use of a same identifier, however other field matching such as through the use of pointers may also be used.

The branch of service field 304 identifies a branch of service in which a user has served or is currently serving. For example, the branches of services identified in the branch of service field 304 may include Army, Navy, Marine Corps, National Guard, and Coast Guard.

The military rank field 306 identifies a current rank of the user. For example, the current rank of the user in the military rank field 306 may include second lieutenant, first lieutenant, captain, major, lieutenant colonel, colonel, brigadier general, major general, lieutenant general, general such as for the military branches of the Army, Air Force, and/or Marines, and ensign, lieutenant junior grade, lieutenant, lieutenant commander, commander, captain, rear admiral, vice admiral, and admiral for the military branches of the Navy and/or Coast Guard. In an example embodiment, the current rank may be stored as a numeric value, an identity of which may be looked up in a table.

The military activity status field 308 identifies the military status of the user. For example, the military status of the user may include active, retired, precommissioned, active reserved, retired, inactive reserve, none and separated.

The service date field 310 includes a service start date of the user such as an enlistment date, a commission date, or any other date identifying when the user started service with the military.

The service component field 312 identifies where the user is serving (e.g., in the Reserve/Guard or in Active Service). [CHANGE FOR MILITARY FIELDS]

Figure 4:
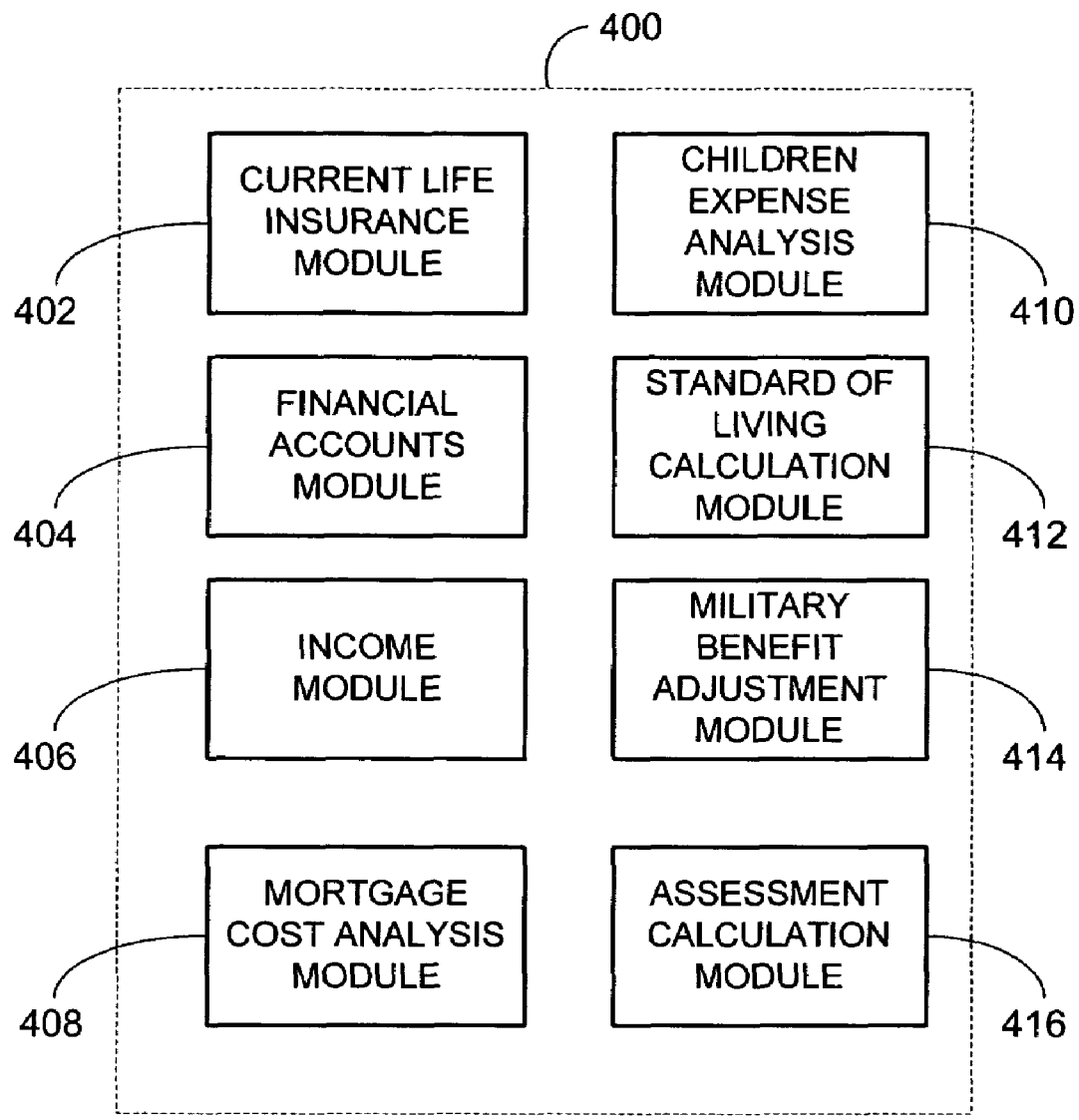
FIG. 4 is a block diagram of a financial goal assessment application according to an example embodiment.

Referring to FIG. 4, an example financial goal assessment application 400 is illustrated. In an example embodiment, the functionality of the financial goal assessment application 104 (see FIG. 1) may include the functionality of the financial goal assessment application 400.

A current life insurance module 402 accesses life insurance information for the user and optionally the spouse. For example, the current life insurance module 402 may access the current permanent life insurance and/or term life insurance coverage amounts for the user and optionally the spouse.

A financial accounts module 404 accesses financial account amounts for the user and optionally the spouse. For example, the financial accounts module 404 may access account values for one or more retirement accounts and/or non-retirement accounts for the user and optionally the spouse.

An income module 406 accesses current and future incomes of the user and optionally the spouse. For the income module 406 may access current income, future income, earned annual income, pension, and/or social security benefits for the user and optionally the spouse.

A mortgage cost analysis module 408 accesses a mortgage amount that the user and optionally the spouse seeks to have paid off in the event the user (or optionally the spouse) dies.

A children expense analysis module 410 accesses college expenses for a number of dependent children (and optionally ages of the dependent children) of the user. For example, the child expense module 410 may take a present value of a cost of a child to attend college (e.g., public or private) for four years while utilizing the rate of college inflation, the number of years until the child turns college age, and a rate of return on college funding assets for the calculation.

A standard of living calculation module 412 accesses a percentage of the standard of living amount that the user and optionally the spouse may seek to retain during retirement.

A military benefit adjustment module 414 determines the military benefits that the user and optionally the spouse.

An assessment calculation module 416 calculates a retirement income and a survivorship benefit may be applied to offset an insurance amount for the user and optionally the spouse.

It should be appreciated that any of the modules 402-416 may be used with other applications in addition to the financial goal assessment application 400, and that modules beyond the modules listed above with significant and/or minor changes may also be used.

Figure 5:
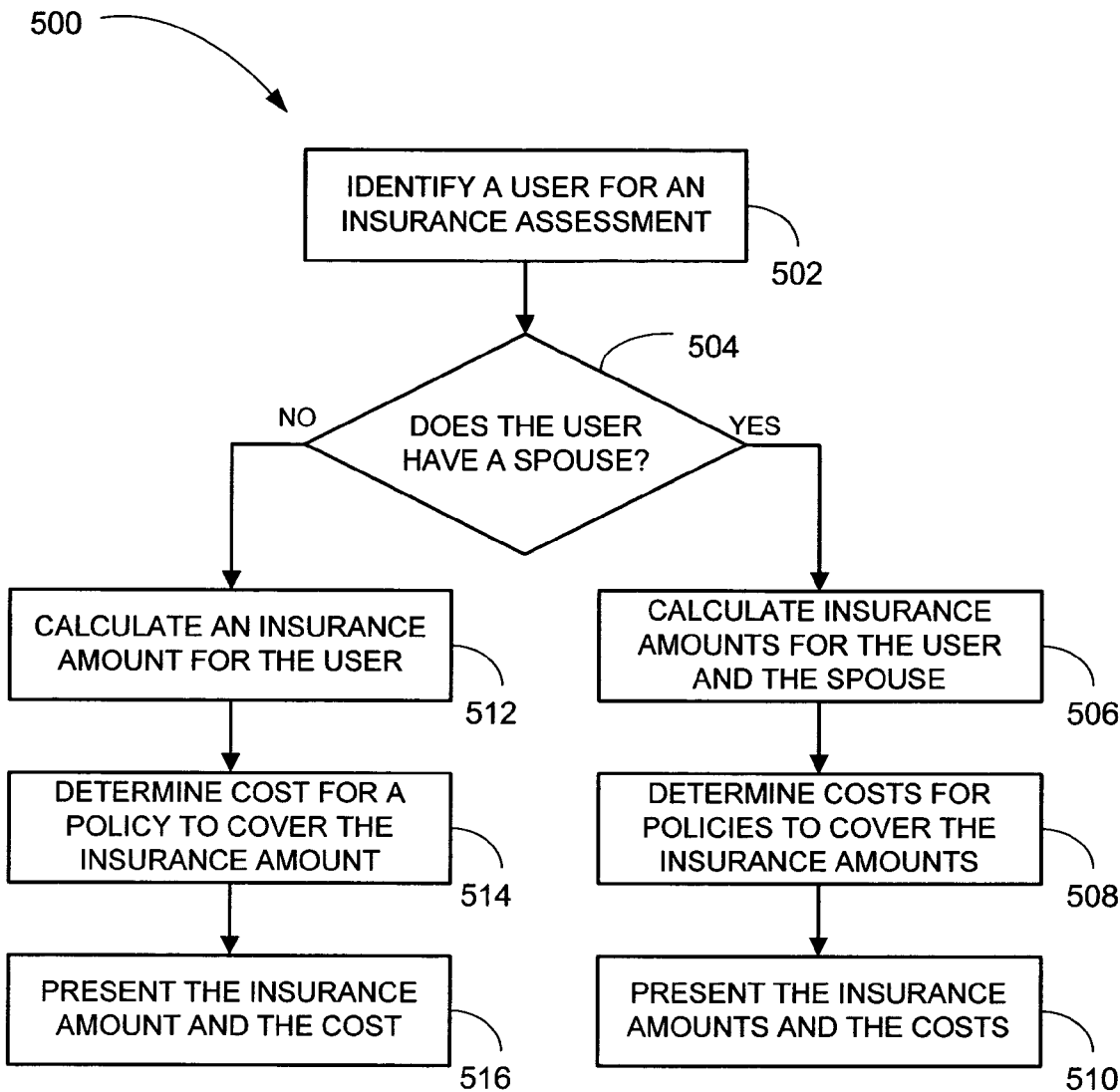
FIG. 5 is a flowchart illustrating a method in accordance with an example embodiment for performing an insurance assessment.

Referring to FIG. 5, a method 500 for performing an insurance assessment in accordance with an example embodiment is illustrated. In an example embodiment, the method 500 may be performed by financial goal assessment application 104, 400 (see FIGS. 1 and 4).

A user may be identified for an insurance assessment at block 502. For example, the insurance assessment may determine a desired amount of insurance to meet a financial and/or retirement plan of the user and optionally the spouse. In an example embodiment, the user may be identified through the user interface 102 to the financial goal assessment application 104 (see FIG. 1).

At decision block 504, a determination may be made whether the user has a spouse (e.g., a significant other in a relationship with the user that may qualify the significant other for benefits flowing from the user). For example, the user may identify on the user interface 102 whether the user has a spouse and/or a marital status field 212 (see FIG. 2) may be accessed to determine whether the user has a spouse.

If a determination is made that the user has a spouse, insurance amounts of the user and the spouse may be calculated at block 506, costs for policies to cover the insurance amounts for the user and the spouse may be calculated at block 508, and the insurance amounts and the costs may be presented at block 510. An example implementation of a method for calculating the insurance amounts of the user and the spouse is described in greater detail below.

If a determination is made that the user does not have a spouse, one or more insurance amounts of the user may be calculated at block 512, costs for the policies to cover the insurance amounts for the user may be calculated at block 514, and the insurance amount and the cost may be presented at block 516. For example, the policies may include current permanent life insurance (e.g., whole life, universal life, and interest sensitive life), current term life, and other life insurance policies with or without a cash value. An example implementation of a method for calculating an insurance amount for the user is described in greater detail below. In an example embodiment, the insurance amount for the user may be an amount to cover the debts of the user.

Upon completion of the operations at block 510 and/or block 516, the method 500 may terminate.

Figure 6:
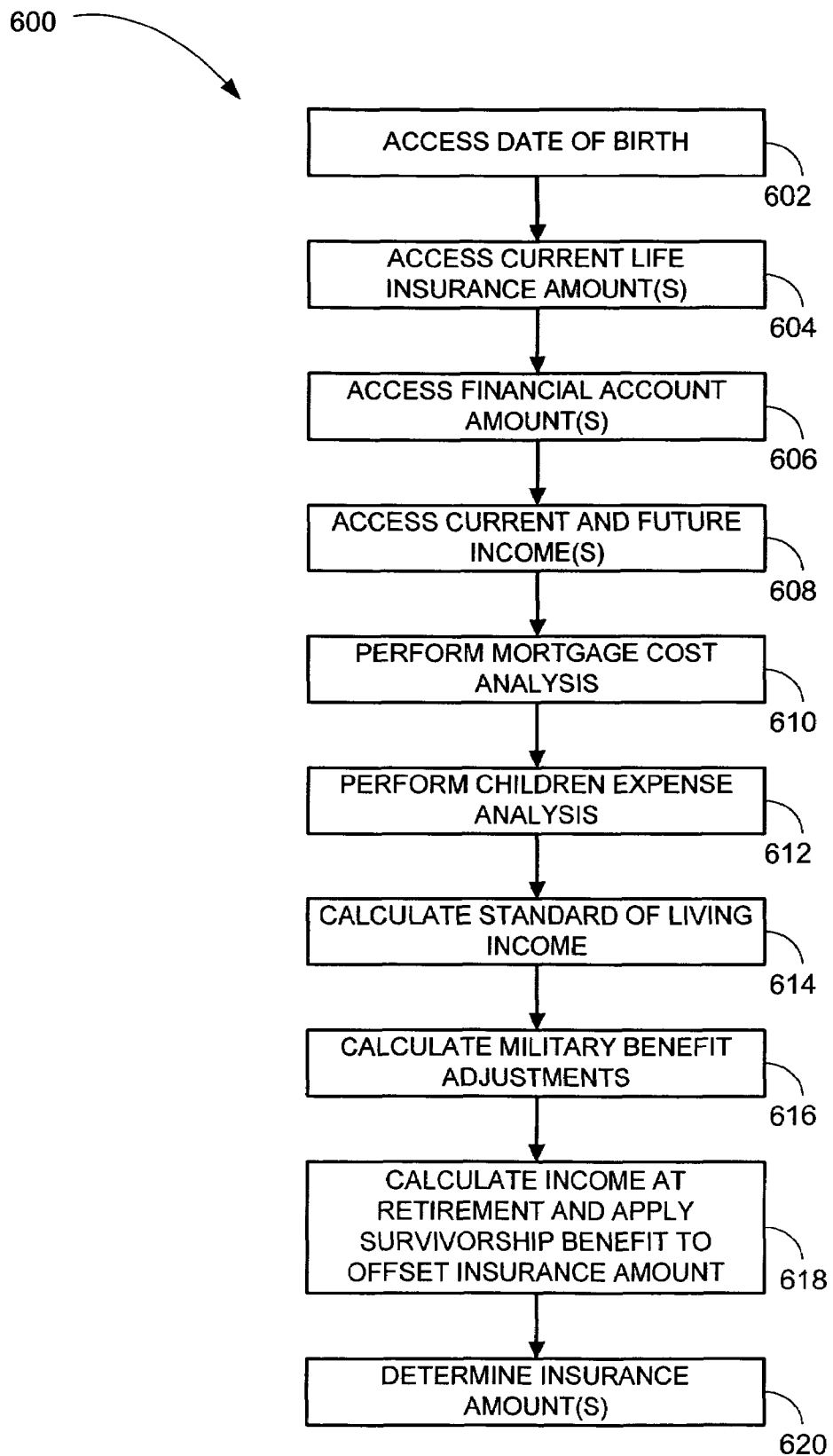
FIG. 6 is a flowchart illustrating a method in accordance with an example embodiment for calculating an insurance amount.

Referring to FIG. 6, a method 600 for calculating an insurance amount in accordance with an example embodiment is illustrated. In an example embodiment, the operations of the method 600 may be performed at block 506 and/or block 512 (see FIG. 5). In an example embodiment, the method 600 may be performed by the financial goal assessment application 104, 400 (see FIGS. 1 and 4).

A date of birth may be accessed for the user and optionally the spouse at block 602. For example, the date of birth may be obtained from the date of birth field 210 (see FIG. 2) and/or through the user interface 102 (see FIG. 1).

Current life insurance amounts may be accessed for the user and optionally the spouse at block 604. For example, the user may provide the current permanent life insurance and/or term life insurance coverage amounts for the user and optionally the spouse through the user interface 102. In an example embodiment, the operations at block 604 may be performed by the current life insurance module 402 (see FIG. 4).

Financial account amounts may be accessed at block 606. For example, the user may provide account values for one or more retirement accounts and/or non-retirement accounts through the user interface 102. The retirement accounts may include individual retirement accounts (IRAs), Roth IRAs, 401(k)s, 403(b)s, thrift savings plans (TSPs), other tax-advantaged federal retirement programs, and/or other non-tax advantaged federal retirement programs. The non-retirement accounts may include investment and/or bank accounts that may not be considered part of a retirement plan of the user and optionally the spouse. In an example embodiment, the operations at block 606 may be performed by the financial accounts module 404 (see FIG. 4).

Current and future incomes may be accessed at block 608. For example, the current income (e.g., primary and supplementary incomes), future income, earned annual income (e.g., pre-tax employment income excluding retirement pay and other income), pension (e.g., payments made by a former employer as a retirement benefit that may continue as long as the retiree lives), and/or social security benefits for the user and optionally the spouse may be provided through the user interface 102. In an example embodiment, a request may be made to the user through the user interface 102 as to whether the user specified whether the incomes will terminate upon the death of the user and/or the spouse so that any continuing income from a first person (e.g., the user or the spouse) may offset an insurance amount for the second person. In an example embodiment, the operations at block 608 may be performed by the income module 406 (see FIG. 4).

A mortgage analysis may be performed at block 610. For example, the user (through the user interface 102) may optionally provide a mortgage amount, the user may be prompted as to whether the mortgage (e.g., on a house) should be paid off in the event the user (or optionally the spouse) dies, and the insurance amount may be adjusted if the mortgage is to be paid off. In an example embodiment, the mortgage amount may be a current remaining portion of the mortgage, an expected portion of the mortgage to be remaining, a desired amount of mortgage to be paid off, or the like. In an example embodiment, the operations at block 610 may be performed by the mortgage cost analysis module 408 (see FIG. 4).

A children expense analysis may be performed at block 612. For example, a number of dependent children (and optionally ages of the dependent children) of the user may be accessed (e.g., through the user interface 102). In an example embodiment, the ages of the dependent children may be used to determine social security benefits. A number of the dependent children that may attend college (e.g., a public and/or private college) may be determined to enable a college cost for the dependent children to be calculated. For example, the college cost may be estimated by the children expense analysis module 410 (see FIG. 4) and may be modified by the user. In an example embodiment, the operations at block 612 may be performed by the children expense analysis module 410 (see FIG. 4).

A standard of living calculation may be performed at block 614. For example, a user may provide through the user interface 102 a percentage of the standard of living amount for the user (and optionally the spouse) may seek to retain during retirement and/or a default percentage (e.g., from the lookup data 118) may be used to determine a desired amount of future income. In an example embodiment, the operations at block 614 may be performed by the standard of living calculation module 412 (see FIG. 4).

A military benefit adjustment may be calculated at block 616. For example, the military benefits that the user and optionally the spouse may be provided (e.g., by the government) may be determined. An example embodiment of determining the military benefit adjustment is described in greater detail below.

An income at retirement (e.g., retirement income) may be calculated and a survivorship benefit may be applied to offset one or more insurance amounts at block 618.

At block 620, one or more life insurance amounts may be calculated for the user and optionally the spouse. For example, a permanent life insurance amount and a term life insurance amount may be calculated for the user and optionally the spouse. In an example embodiment, the term life insurance may reflect an insurance amount prior to the retirement of the user (e.g., by subtracting current income from a current desired financial goal) and the permanent life insurance may reflect an insurance amount after the retirement of the user (e.g., by subtracting future income from a future desired financial goal).

In an example embodiment, a desired financial goal may include a mortgage amount, other debts, final expenses, an emergency fund, a present value of college costs, a present value of living to a retirement age, and/or a present value of living after the retirement age for the user and optionally the spouse. However, other values may be used for the desired financial goal.

In an example embodiment, income may include a present value of a survivor's pre-retirement income, a present value of other income to and after the retirement age, retirement assets, non-retirement asset distributions, current permanent life insurance, current term life insurance, a present value of a nonmilitary pension, a present value of a non-military survivorship, a value of military monthly retirement pensions to and after the retirement age, a present value of a Dependency and Indemnity Compensation (DIC) to and after the retirement age, a value of military survivorship, a value of social security retirement, a value of social security survivorship until a youngest child is a child majority age (e.g., 18), and/or a value of the social security survivorship after the retirement age. However, other values may be used for the income.

Upon completion of the operations at block 620, the method 600 may terminate.

Figure 7:
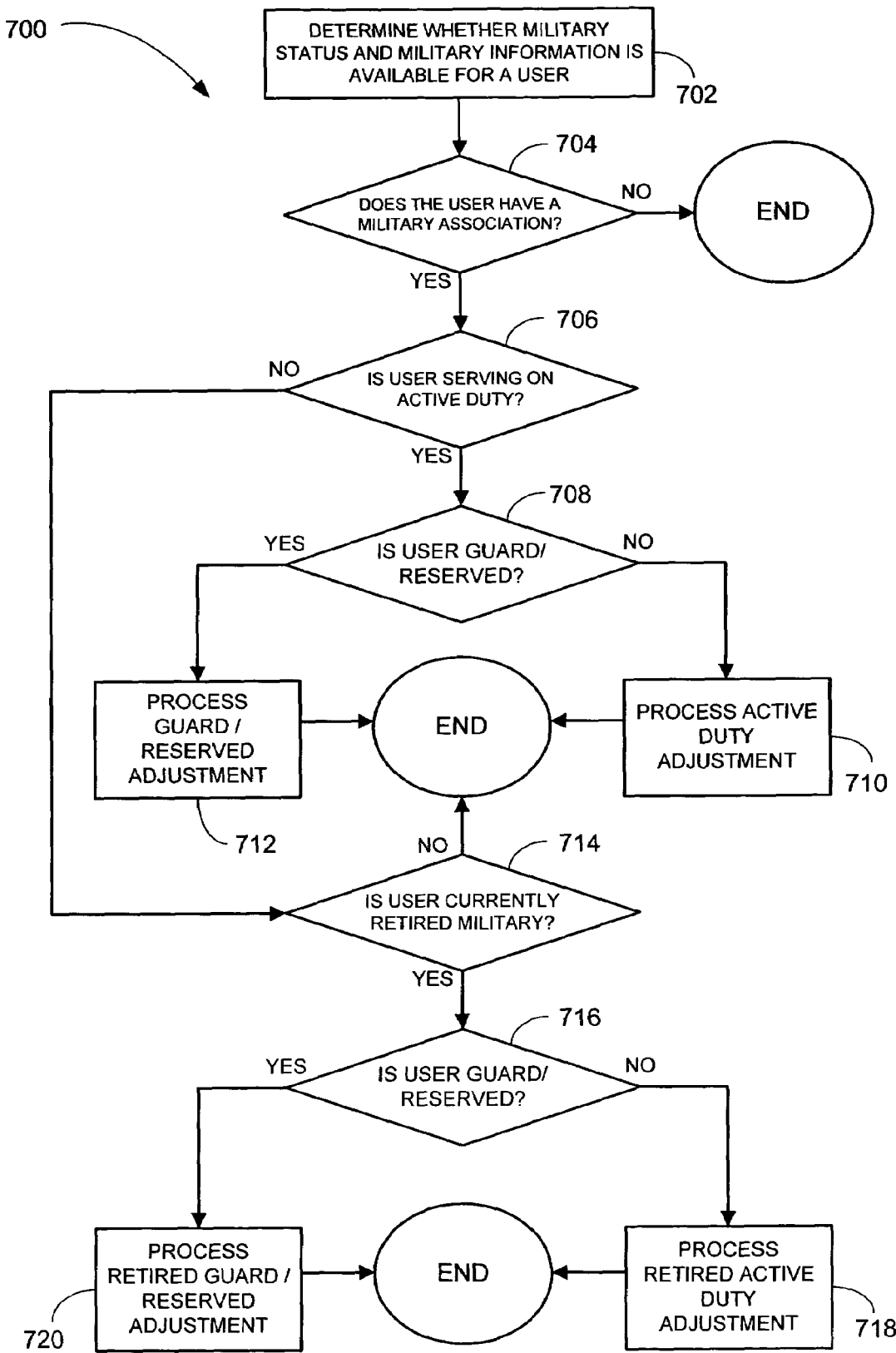
FIG. 7 is a flowchart illustrating a method in accordance with an example embodiment for determining military benefit adjustments.

Referring to FIG. 7, a method 700 for determining a military benefit adjustment in accordance with an example embodiment is illustrated. In an example embodiment, the operations of the method 700 may be performed at block 418 (see FIG. 4). In an example embodiment, the method 700 may be performed by the military benefit adjustment module 414 (see FIG. 4).

A determination may be performed at block 702 to determine whether military information and/or a military status is available for the user. For example, the military information and/or the military status for the user may be retained with the military data 116 and/or provided through the user interface 102 (see FIG. 1).

In an example embodiment, information may be provided for a first time through the user interface 102 and/or modified by the user through the user interface 102 after being obtained from the user data 114, the military data 116, and/or the lookup data 118.

At decision block 704, a determination may be made as to whether the user has a military association (e.g., has military status and military information). For example, the user may have a military association when a user identification value of the user identification field 302 of the military service data structure 300 corresponds has a matching entry as the user identification value of the user identification field 202 of the user data structure 200 (see FIGS. 2 and 3). If the user does not have a military association, the method 700 may terminate (e.g., such that the user and optionally the spouse of the user has a zero value for the military benefit adjustments). If the user has a military association, the method 700 may proceed to decision block 706.

A determination may be made at decision block 706 as to whether the user is serving on Active Duty (e.g., has an active military status). For example, the military status of the user may be accessed from the service component field 312 (see FIG. 3). If the user is serving on active duty, the method 700 may proceed to decision block 708.

At decision block 708, a determination may be made as to whether the user is currently serving as a Guard Officer (e.g., the National Guard) or a Reserves Officer (e.g., the Army Reserves). For example, the branch of service information used to make the determination at decision block 708 may be accessed from the branch of service field 304 (see FIG. 3).

If the user is not a Guard Officer or a Reserves Officer, an Active Duty adjustment (e.g., a military adjustment for a user that is Active Duty in the military) may be processed at block 710. An example embodiment for processing the Active Duty adjustment is described in greater detail below.

If the user is a Guard Officer or a Reserves Officer, a Guard/Reserves adjustment (e.g., a military adjustment for a user that is a Guard or Reserves in the military) may be processed at block 712. An example embodiment for processing the Guard/Reserves adjustment is described in greater detail below. In an example embodiment, the selection between the Active Duty adjustment and the Guard/Reserves adjustment may affect a user's survivorship benefits.

If the user is not serving on Active Duty at decision block 706, the method 700 may proceed to decision block 714 to determine whether the user is a currently retired military officer. If the user is not a currently retired military officer, the method 700 may terminate (e.g., as the user may have a separated status and may therefore not be entitled to a military adjustment). If the user is a currently retired military officer, the method 700 may proceed to decision block 716.

At decision block 716, a determination may be made as to whether the user is a currently retired Guard officer or a Reserves officer. If the user is not a currently retired Guard officer or a Reserves officer, a retired Active Duty adjustment (e.g., a military adjustment for a user that is retired from Active Duty in the military) may be processed at block 718. An example embodiment of processing the retired Active Duty adjustment is described in greater detail below. If the user is a Guard officer or a Reserves officer, a retired Guard/Reserves adjustment (e.g., a military adjustment for a user that is retired from the Guard or Reserves) may be processed at block 720.

Upon completion of the operations at block 710, block 712, block 718, or block 720, the method 700 may terminate.

In an example embodiment, the user data 114 and/or the military data 116 of the user and/or the spouse may be accessed as needed and/or obtained at once by the method 700.

Figure 8:
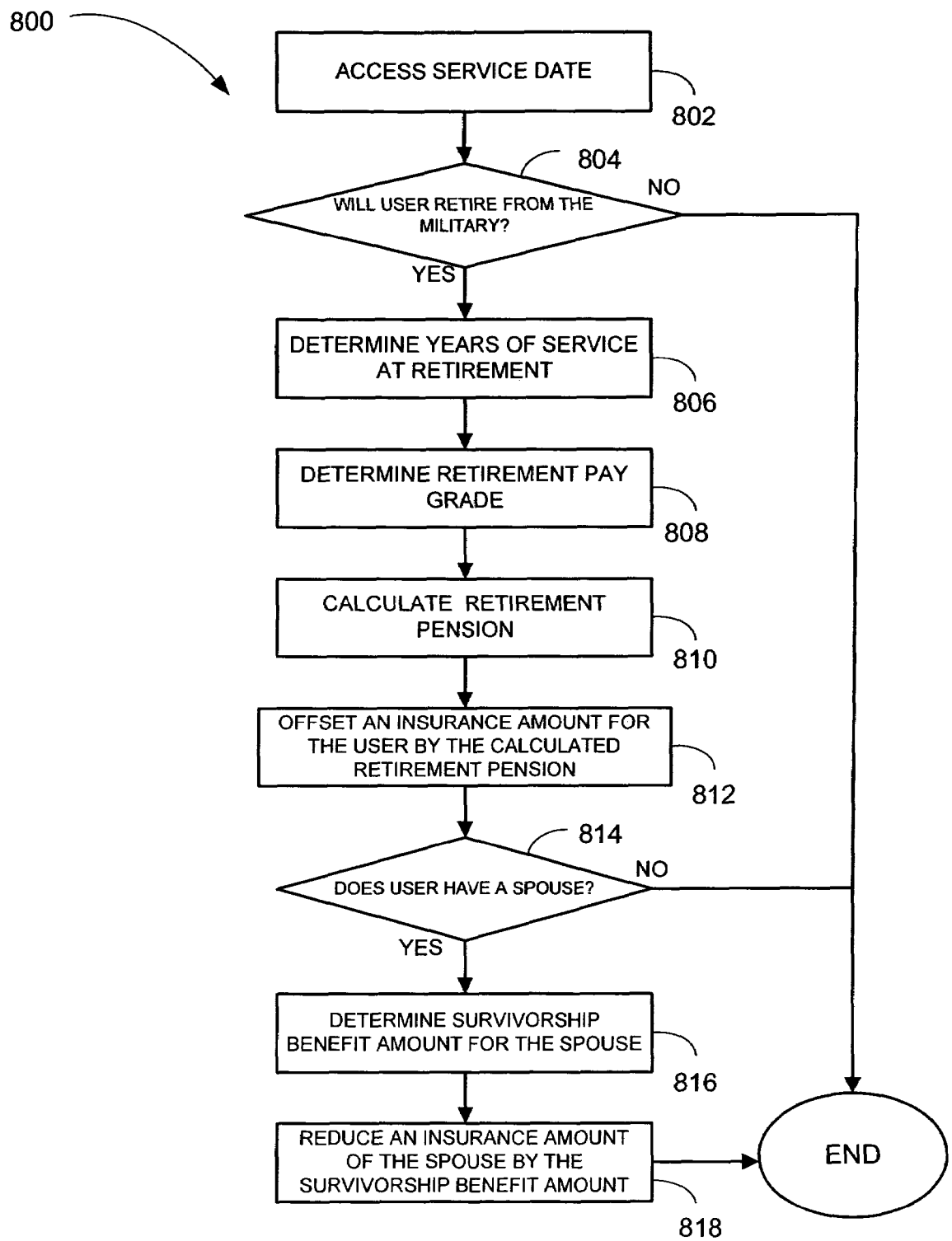
FIG. 8 is a flowchart illustrating a method in accordance with an example embodiment for processing an Active Duty adjustment.

Referring to FIG. 8, a method 800 for processing an Active Duty adjustment in accordance with an example embodiment is illustrated. In an example embodiment, the operations of the method 800 may be performed at block 710 (see FIG. 7).

A service date (e.g., a date that the user entered in military service) may be accessed at block 802. For example, the service data may be accessed from the service data field 310 (see FIG. 3) of the user and/or provided by the user through the user interface 102.

At decision block 804, a determination may be made as to whether the user will retire from the military. For example, the user may be prompted through the user interface 102 (see FIG. 1) to indicate whether the user plans to retire from the military. In an example embodiment, the user may indicate a plan to retire if the user will meet a military service requirement (if required by the military) and/or may indicate a plan not to retire if the user will separate from the military without benefits. An example embodiment of prompting the user through the user interface 102 to make the determination is described in greater detail below.

If the user will not retire from the military, the method 800 may terminate. For example, the user may be provided with benefits while serving (e.g., SBP and/or DIC) in active duty but may not have benefits once separated from the military. The benefits may affect the insurance amount calculations (see block 506 or block 512 of FIG. 5).

If the user will retire from the military, a number of years of service that the user may have at retirement may be determined at block 806. For example, the number of years of service at retirement may be estimated as a minimum number needed for retirement (e.g., twenty years) from the lookup data 118 (see FIG. 1) and/or may be calculated from the service date of the service date field 310 (see FIG. 3). The user may input and/or modify the number of years of service at retirement through the user interface 102.

A retirement pay grade may be determined at block 808. For example, a retirement pay grade may be determined by accessing the lookup data 118 with the branch of service field 304 and military rank field 306 (see FIG. 3). In an example embodiment, the user may specify an expected pay grade at time of retirement.

A retirement pension may be calculated at block 810. For example, a retirement pension may be determined by performing a lookup in the lookup data 118 using the number of years of service and the pay grade at retirement. An insurance amount for the user may be offset by the calculated retirement pension at block 812 (e.g., since insurance need not cover the user for a portion of income that is not lost pursuant to the user receiving the retirement pension).

At decision block 814, a determination may be made as to whether the user has a spouse. If the user does not have a spouse, the method 800 may terminate. If the user has a spouse, a survivor benefit amount may be determined for the spouse at block 816. For example, the survivor benefit amount may be fifty-five percent of retirement income of the user, an amount accessed from the lookup data 118, and/or other amounts that may be estimated and/or provided by the user may also be used.

An insurance amount of the spouse (e.g., a spouse insurance amount) may then be reduced by the survivorship benefit amount at block 818 (e.g., the spouse may not need to replace lost income of the user upon the death of the user if the spouse will receive the survivorship benefit amount). Upon completion of the operations at block 818, the method 800 may terminate.

It may be appreciated that a different financial value other then the insurance amount of the user and optionally the spouse may be offset by the calculated retirement pension at block 812 and the survivor benefit amount at block 818 respectively.

Figure 9:
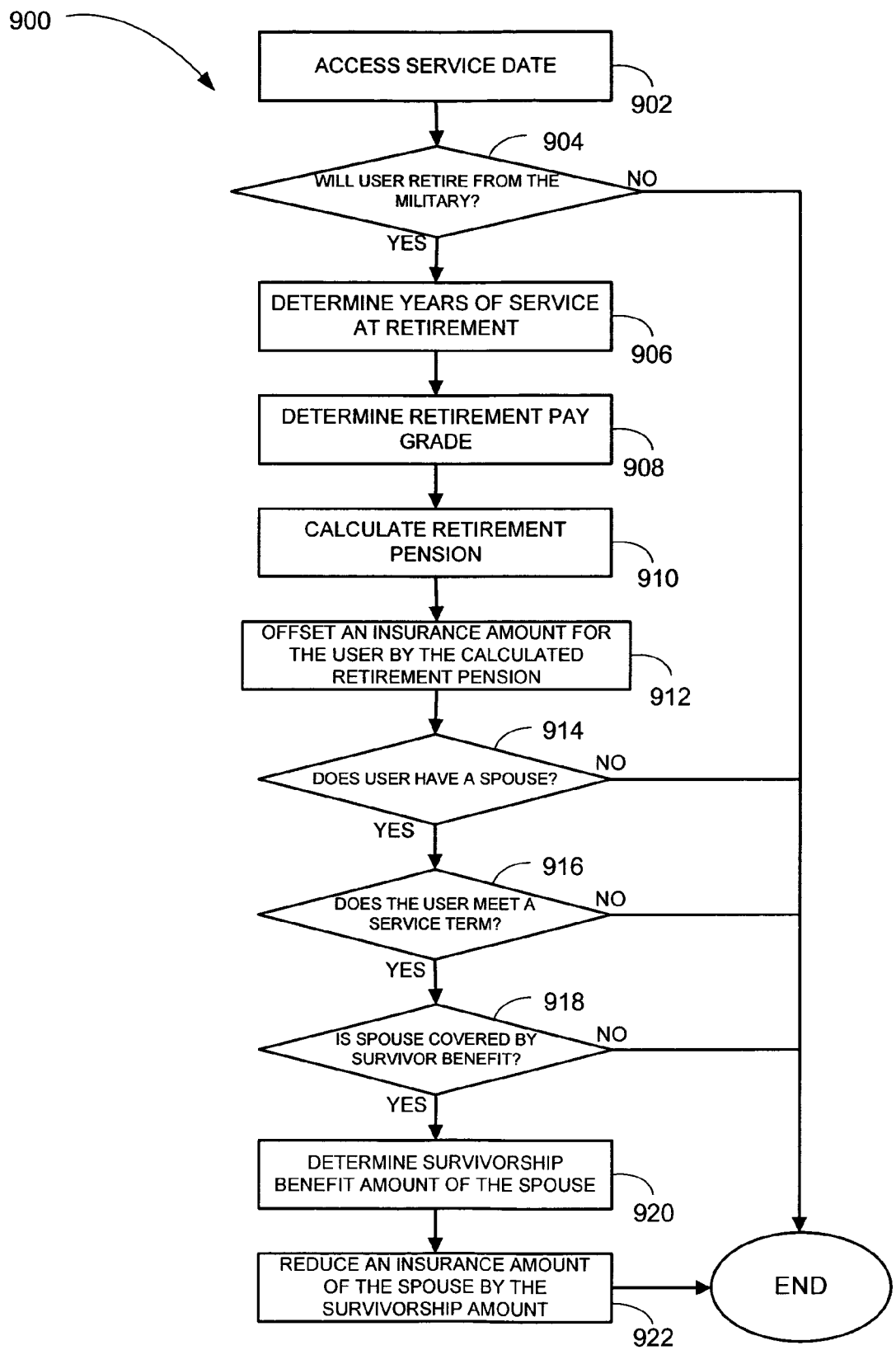
FIG. 9 is a flowchart illustrating a method in accordance with an example embodiment for processing a Guard/Reserves adjustment.

Referring to FIG. 9, a method 900 for processing a Guard/Reserves adjustment in accordance with an example embodiment is illustrated. In an example embodiment, the operations of the method 900 may be performed at block 712 (see FIG. 7).

A service date (e.g., a date that the user entered in military service) may be accessed at block 902. For example, the service data may be accessed from the service data field 310 (see FIG. 3) of the user and/or provided by the user through the user interface 102.

At decision block 904, a determination may be made as to whether the user will retire from the military. For example, the user may be prompted through the user interface 102 (see FIG. 1) to indicate whether the user plans to retire from the military. In an example embodiment, the user may indicate a plan to retire if the user will meet a military service requirement (if required by the military) and/or may indicate a plan not to retire if the user will separate from the military without benefits. An example embodiment of prompting the user through the user interface 102 to make the determination is described in greater detail below.

If the user will not retire from the military, the method 900 may terminate. For example, the user may be provided with benefits while serving (e.g., SBP and/or DIC) in active duty but may not have benefits once separated from the military. The benefits may affect the insurance amount calculations (see block 506 or block 512 of FIG. 5).

If the user will retire from the military, a number of years of service that the user may have a retirement may be determined at block 906. For example, the number of years of service at retirement may be estimated as a minimum number needed for retirement (e.g., twenty years) from the lookup data 118 (see FIG. 1) and/or may be calculated from the service date of the service date field 310 (see FIG. 3). The user may input and/or modify the number of years of service at retirement through the user interface 102.

A retirement pay grade may be determined at block 908. For example, a retirement pay grade may be determined by accessing the lookup data 118 with the branch of service field 304 and military rank field 306 (see FIG. 3). In an example embodiment, the user may specify an expected pay grade at time of retirement.

A retirement pension may be calculated at block 910. For example, a retirement pension may be determined by performing a lookup in the lookup data 118 using the number of years of service and the pay grade at retirement. In an example embodiment, an amount of points for the user may be estimated to determine the retirement pension.

An insurance amount for the user may be offset by the calculated retirement pension at block 912 (e.g., since insurance need not cover the user for a portion of income that is not lost pursuant to the user receiving the retirement pension).

At decision block 914, a determination may be made as to whether the user has a spouse. If the user does not have a spouse, the method 900 may terminate. If the user has a spouse, the method 900 may proceed to decision block 916.

A determination may be made at decision block 916 whether the user has met a service term. For example, the service term may a value accessed from the lookup data 118, a twenty year term, or a greater or less service term (e.g., as may be defined for the military) may also be used. If the user has not met the service term, the method 900 may terminate. If the user has met the service term, the method 900 may proceed to decision block 918.

A determination may be made at decision block 918 whether the spouse is covered by a survivorship benefit. For example, the survivor benefit amount may be fifty-five percent of retirement income of the user, an amount accessed from the lookup data 118, and/or other amounts that may be estimated and/or provided by the user may also be used.

If the spouse is not covered by the survivorship benefit, the method 900 may terminate. If the spouse is covered by the survivorship benefit, the survivorship benefit amount for the spouse may be determined at block 920. An insurance amount of the spouse (e.g., a spouse insurance amount) may then be reduced by the survivorship benefit amount at block 922. Upon completion of the operations at block 920, the method 900 may terminate.

In an example embodiment, the survivor benefit amount may determine an amount of money (e.g., one time and/or monthly basis) paid to a spouse upon the death of the user.

It may be appreciated that a different financial value other then the insurance amount of the user and optionally the spouse may be offset by the calculated retirement pension at block 912 and the survivor benefit amount at block 922 respectively.

Figure 10:
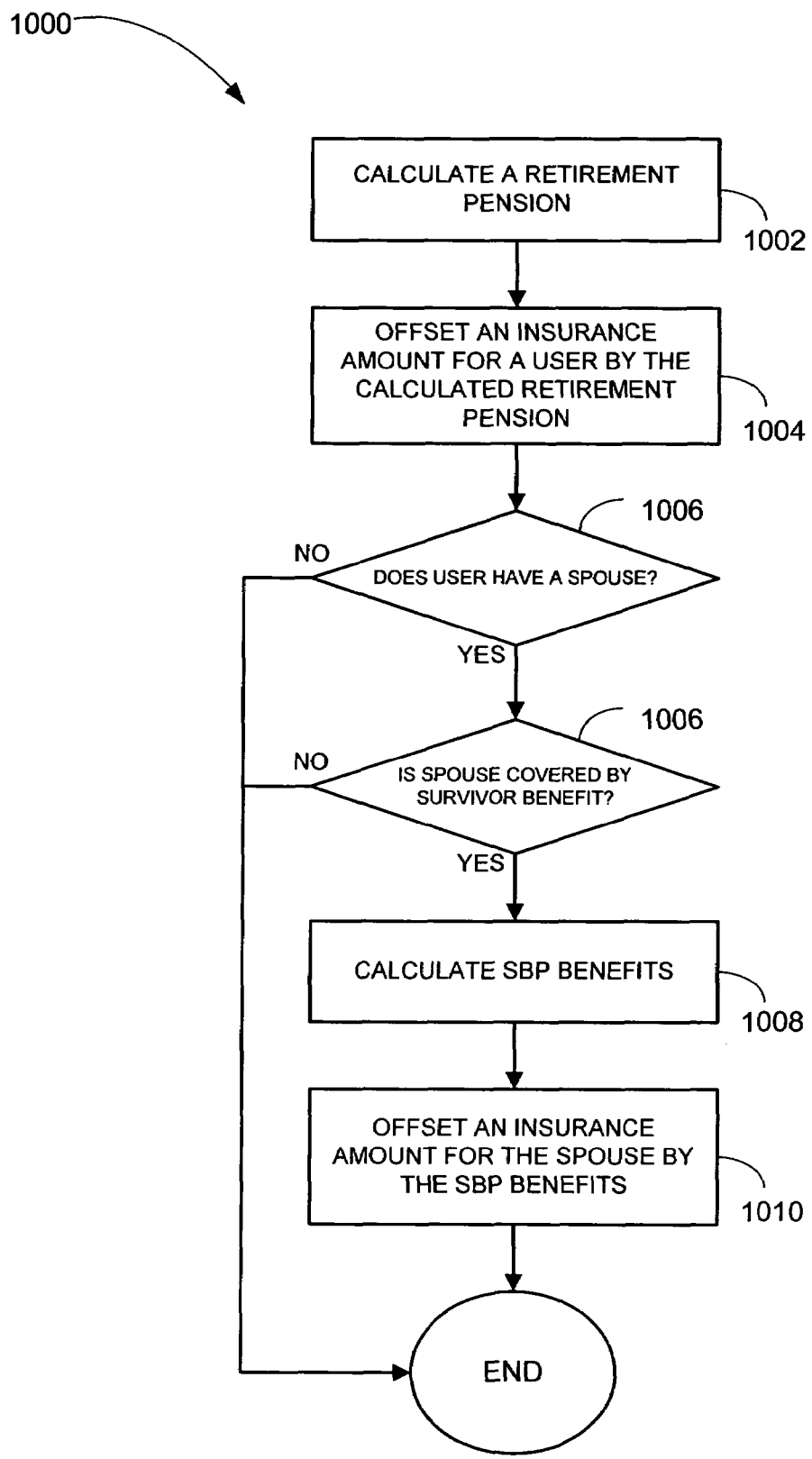
FIG. 10 is a flowchart illustrating a method in accordance with an example embodiment for processing a retired Active Duty adjustment.

Referring to FIG. 10, a method 1000 for processing a retired Active Duty adjustment in accordance with an example embodiment is illustrated. In an example embodiment, the operations of the method 1000 may be performed at block 718 (see FIG. 7).

A retirement pension may be calculated for the user at block 1002. For example, a retirement pension may be determined by performing a lookup in the lookup data 118 using the number of years of service and the pay grade at retirement. In an example embodiment, the user may provide the retirement pension through the user interface 102.

An insurance amount for the user may be offset by the calculated retirement pension at block 1004. At decision block 1006, a determination may be made as to whether the user has a spouse. If the user does not have a spouse, the method 1000 may terminate. If the user has a spouse, the method 1000 may proceed to decision block 1006.

A determination may be made at decision block 1006 whether the spouse is covered by a survivor benefit. For example, the user may specify on the user interface 102 that the spouse of the user is covered by the survivor benefit. If the spouse is not covered by the survivor benefit, the method 1000 may terminate. If the spouse is covered by the survivor benefit, survivor benefit plan (SBP) benefits may be calculated at block 1008. An insurance amount for the spouse (e.g., a spouse insurance amount) may be offset by the SBP benefits at block 1010. Upon completion of the operations at block 1010, the method 1000 may terminate.

It may be appreciated that a different financial value other then the insurance amount of the user and optionally the spouse may be offset by the calculated retirement pension at block 1004 and the SBP benefits at block 1010 respectively.

Figure 11:
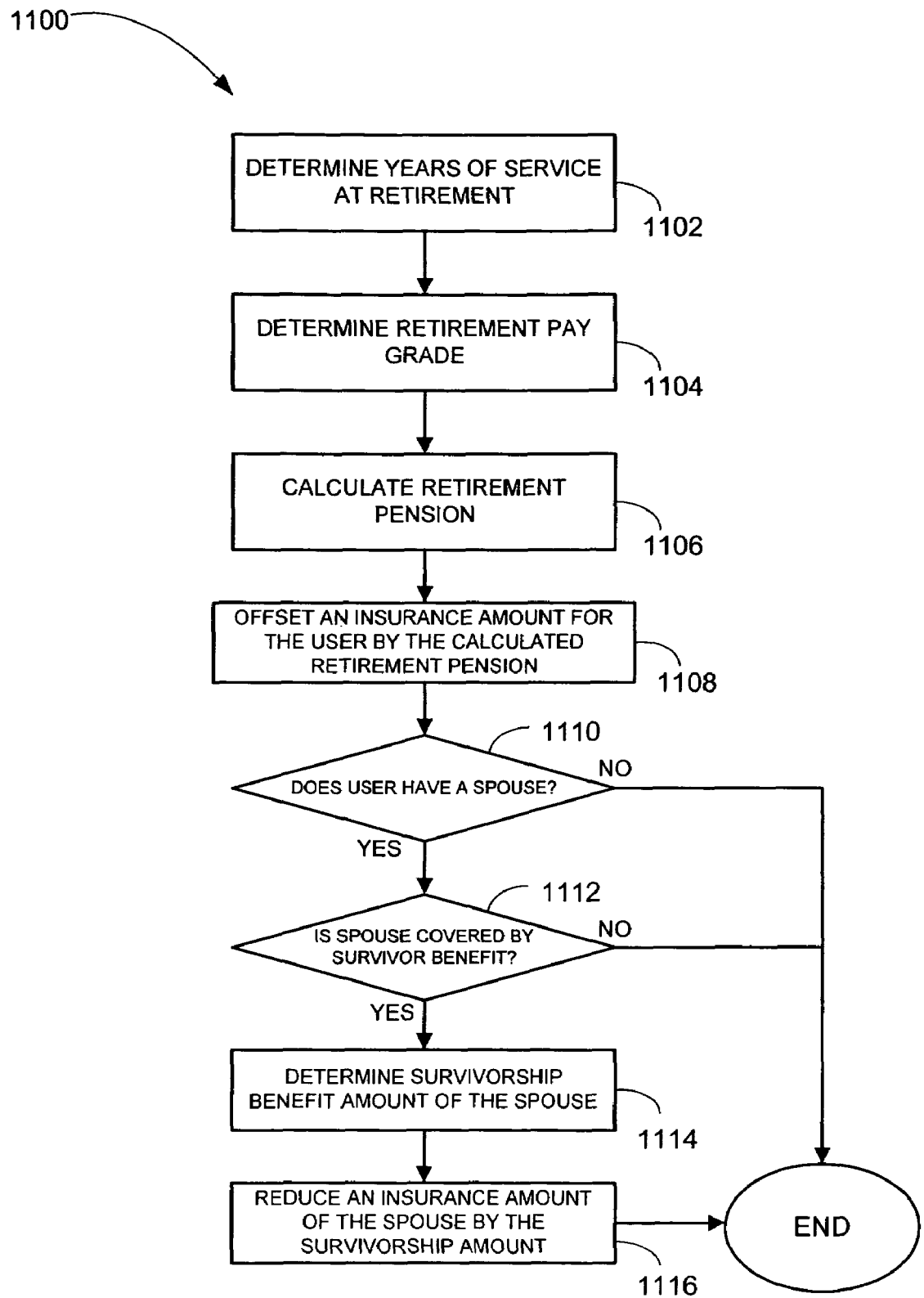
FIG. 11 is a flowchart illustrating a method in accordance with an example embodiment for processing a retired Guard/Reserves adjustment.

Referring to FIG. 11, a method 1100 for processing a retired Guard/Reserves adjustment in accordance with an example embodiment is illustrated. In an example embodiment, the operations of the method 1100 may be performed at block 720 (see FIG. 7).

A number of years of service that the user had at retirement may be determined at block 1102. For example, the user may provide that the number of years of service at retirement through the user interface 102.

A retirement pay grade may be determined at block 1104. For example, a retirement pay grade may be determined by accessing the lookup data 118 with the branch of service field 304 and military rank field 306 (see FIG. 3) and/or provided by the user through the user interface 102.

A retirement pension may be calculated at block 1106. For example, a retirement pension may be determined by performing a lookup in the lookup data 118 using the number of years of service and the pay grade at retirement. In an example embodiment, an amount of points for the user may be used to determine the retirement pension. An insurance amount for the user may be offset by the calculated retirement pension at block 1108.

At decision block 1110, a determination may be made as to whether the user has a spouse. If the user does not have a spouse, the method 1100 may terminate. If the user has a spouse, the method 1100 may proceed to decision block 1112.

A determination may be made at decision block 1112 whether the spouse is covered by a survivorship benefit (e.g., as may have been elected by the user at the time of retirement). If the spouse is not covered by the survivorship benefit, the method 1100 may terminate. If the spouse is covered by the survivorship benefit, the survivorship benefit amount for the spouse may be determined at block 1114. An insurance amount of the spouse (e.g., a spouse insurance amount) may then be reduced by the survivorship benefit amount at block 1116. Upon completion of the operations at block 1116, the method 1100 may terminate.

It may be appreciated that a different financial value other then the insurance amount of the user and optionally the spouse may be offset by the calculated retirement pension at block 1108 and the survivor benefit amount at block 1116 respectively.

Figure 12:
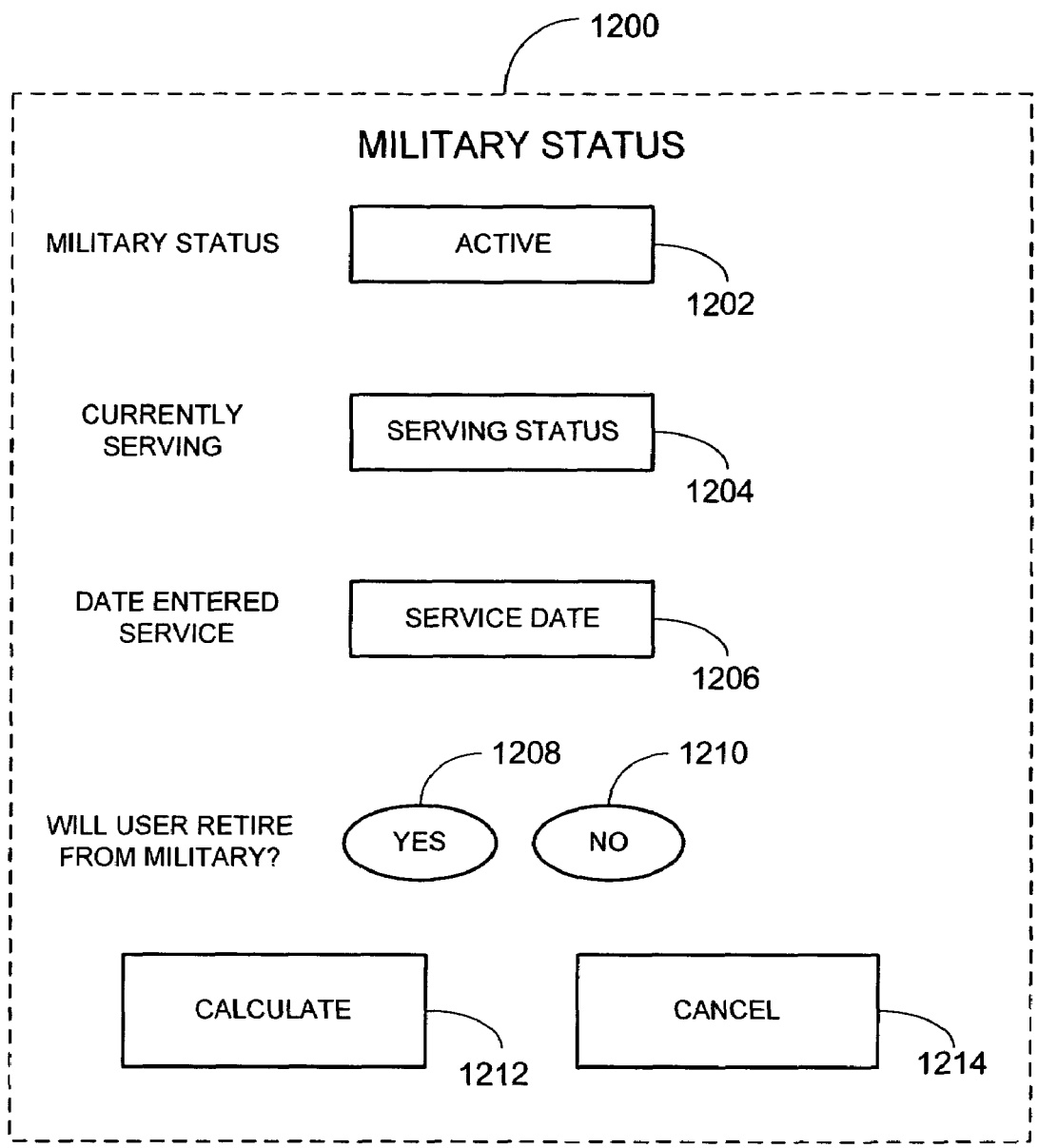
FIGS. 12-15 are block diagrams of example user interfaces.

Referring to FIG. 12, a user interface 1200 in accordance with an example embodiment is illustrated. In an example embodiment, the user interface 1200 may be for when a user selects a military status of activity military status (e.g., to process the Active Duty adjustment at block 510 of FIG. 5).

A military status field 1202 may contain (e.g., as provided by the user through the user interface 102 and/or accessed from the military data 116 of FIG. 1) a military status of the user. As shown in the user interface 1200, the military status of the user may be active duty military status. However, other military statuses may also be used with the user interface 1200.

A currently serving field 1204 may contain a serving status (e.g., active duty status) of the user. A date entered service field 1206 may contain a service date that the user joined the military service.

The user may specify whether the user will retire from the military by selected a yes selection 1208 or a no selection 1210.

Once the fields 1202-1206 and the yes selection 1208 or the no selection 1210 contain appropriate information, the user may select a calculation selection 1212 to calculate an a military adjustment or a cancel selection 1214 to cancel a calculation process.

In an example embodiment, completing the fields 1202-1206 and making the selection 1208 or the selection 1210 may provide information used to determine the active duty military adjustment for the user. For example, selecting the calculation selection 1212 may provide information from the fields 1202-1206 and the selection 1208 or the selection 1210 and access other information from the user data 114, the military data 116, and/or the lookup data 118 to process the active duty adjustment at block 510.

Figure 13:
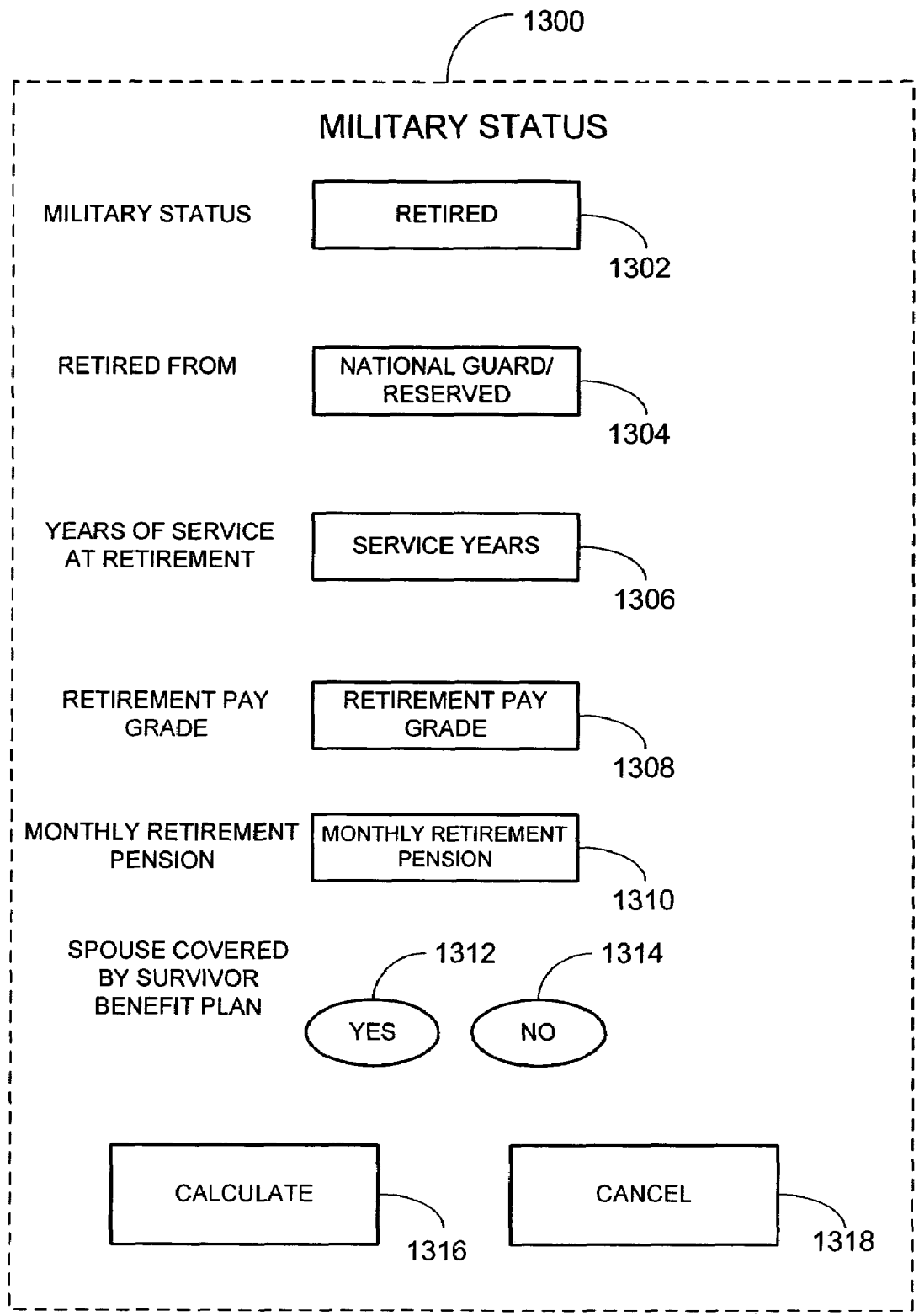

Referring to FIG. 13, a user interface 1300 in accordance with an example embodiment is illustrated. In an example embodiment, the user interface 1300 may be for when a user selects a military status of retired guard/reserves (e.g., to process the retired Guard/Reserves adjustment at block 520 of FIG. 5).

A military status field 1302 may contain (e.g., as provided by the user through the user interface 102 and/or accessed from the military data 136 of FIG. 1) a military status of the user. As shown in the user interface 1300, the military status of the user may be retired guard/reserves military status. However, other military statuses may also be used with the user interface 1300.

A retired from field 1304 may contain a branch of military service from which the user has retired. A years of service field at retirement field 1306 may contain a number of service years that the user will have completed at the time of retirement. A retirement pay grade field 1308 may contain a retirement pay grade (e.g., of the United States government) of the user. A monthly retirement pension field 1310 may contain a monthly retirement pension of the user.

The user may indicate whether the spouse of the user is covered by a survivorship benefit plan by selecting a yes selection 1312 or a no selection.

Once the fields 1302-1310 and the yes selection 1312 or the no selection 1314 contain appropriate information, the user may select a calculate selection 1316 to calculate an a military adjustment or a cancel selection 1318 to cancel a calculation process.

In an example embodiment, completing the fields 1302-1310 and making the selection 1312 or the selection 1314 may provide information used to determine the retired guard/reserves military adjustment for the user. For example, selecting the calculate selection 1316 may provide information from the fields 1302-1310 and the selection 1312 or the selection 1314 and access other information from the user data 134, the military data 136, and/or the lookup data 138 to process the retired guard/reserves military duty adjustment at block 520.

Figure 14:
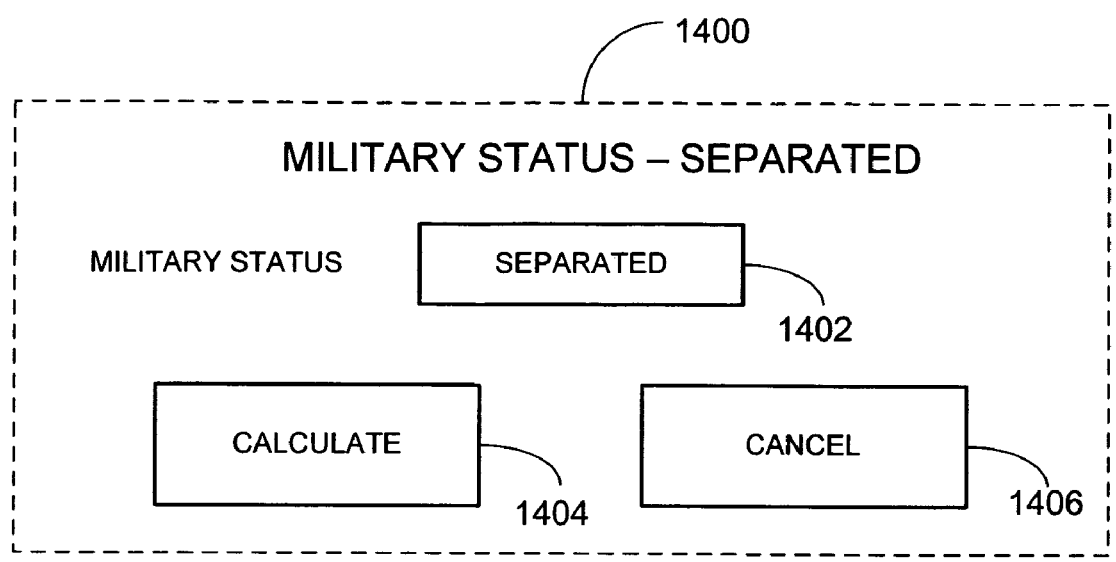

Referring to FIG. 14, a user interface 1400 in accordance with an example embodiment is illustrated. In an example embodiment, the user interface 1400 may be for when a user selects a military status of separated (e.g., by selecting that the user is not currently retired at decision block at block 514 of FIG. 5).

A military status field 1402 may contain (e.g., as provided by the user through the user interface 102 and/or accessed from the military data 116 of FIG. 1) a military status of the user. As shown in the user interface 1400, the military status of the user may be separated. However, other military statuses may also be used with the user interface 1400.

Once the military status field 1402 contains appropriate information, the user may select a calculation selection 1404 to calculate a military adjustment or a cancel selection 1406 to cancel a calculation process. For example, when the military status of the user is separated there may be not military adjustment for the user.

Figure 15:
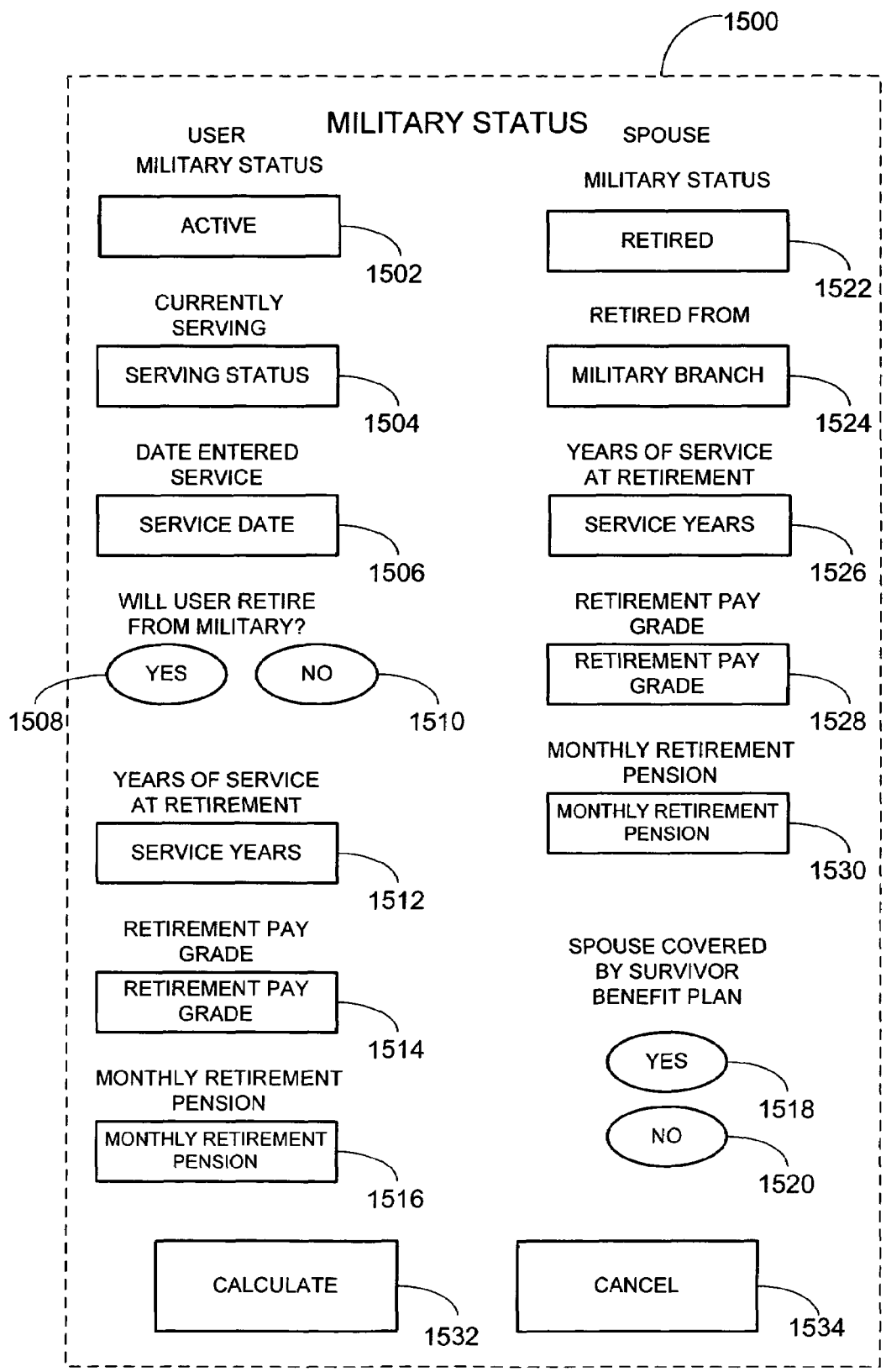

Referring to FIG. 15, a user interface 1500 in accordance with an example embodiment is illustrated. In an example embodiment, the user interface 1500 may be for when a user selects a military status of active duty for the user and a military status of retired guard/reserves for the spouse of the user.

A military status field 1502 may contain (e.g., as provided by the user through the user interface 102 and/or accessed from the military data 116 of FIG. 1) a military status of the user. As shown in the user interface 1500, the military status of the user may be active duty military status. However, other military statuses for the user may also be used with the user interface 1500.

A currently serving field 1504 may contain a serving status of the user. A date entered service field 1506 may contain a service date that the user joined the military service. The user may specify whether the user will retire from the military by selecting a yes selection 1508 or a no selection 1510.

A years of service field at retirement field 1512 may contain a number of service years that the user will have completed at the time of retirement. A retirement pay grade field 1514 may contain a retirement pay grade of the user. A monthly retirement pension field 1516 may contain a monthly retirement pension of the user.

The user may indicate whether the spouse of the user is covered by a survivorship benefit plan by selecting a yes selection 1518 or a no selection 1520.

A military status field 1522 may contain (e.g., as provided by the user through the user interface 102 and/or accessed from the military data 116 of FIG. 1) a military status of the spouse. As shown in the user interface 1500, the military status of the spouse may be retired guard/reserves military status. However, other military statuses may also be used with the user interface 1500.

A retired from field 1524 may contain a branch of military service from which the spouse has retired. A years of service field at retirement field 1526 may contain a number of service years that the spouse will have completed at the time of retirement. A retirement pay grade field 1528 may contain a retirement pay grade (e.g., of the United States government) of the spouse. A monthly retirement pension field 1530 may contain a monthly retirement pension of the spouse.

Once the fields 1502-1506, 1512-1516, 1522-1530 and the yes selections 1508, 1518 and/or the no selection 1510, 1520 contain appropriate information, the user may select a calculation selection 1532 to calculate a military adjustment or a cancel selection 1534 to cancel a calculation process.

In an example embodiment, completing the fields 1502-1506, 1512-1516, 1522-1530 and selecting from among the selections 1508, 1510, 1518, 1520 may provide information used to determine the military adjustments for the user and the spouse.

In an example embodiment, fields for the spouse may be suppressed for privacy concerns. For example, the values of the fields may not be shown to the user but may still be used to calculate the insurance amounts.

Figure 16:
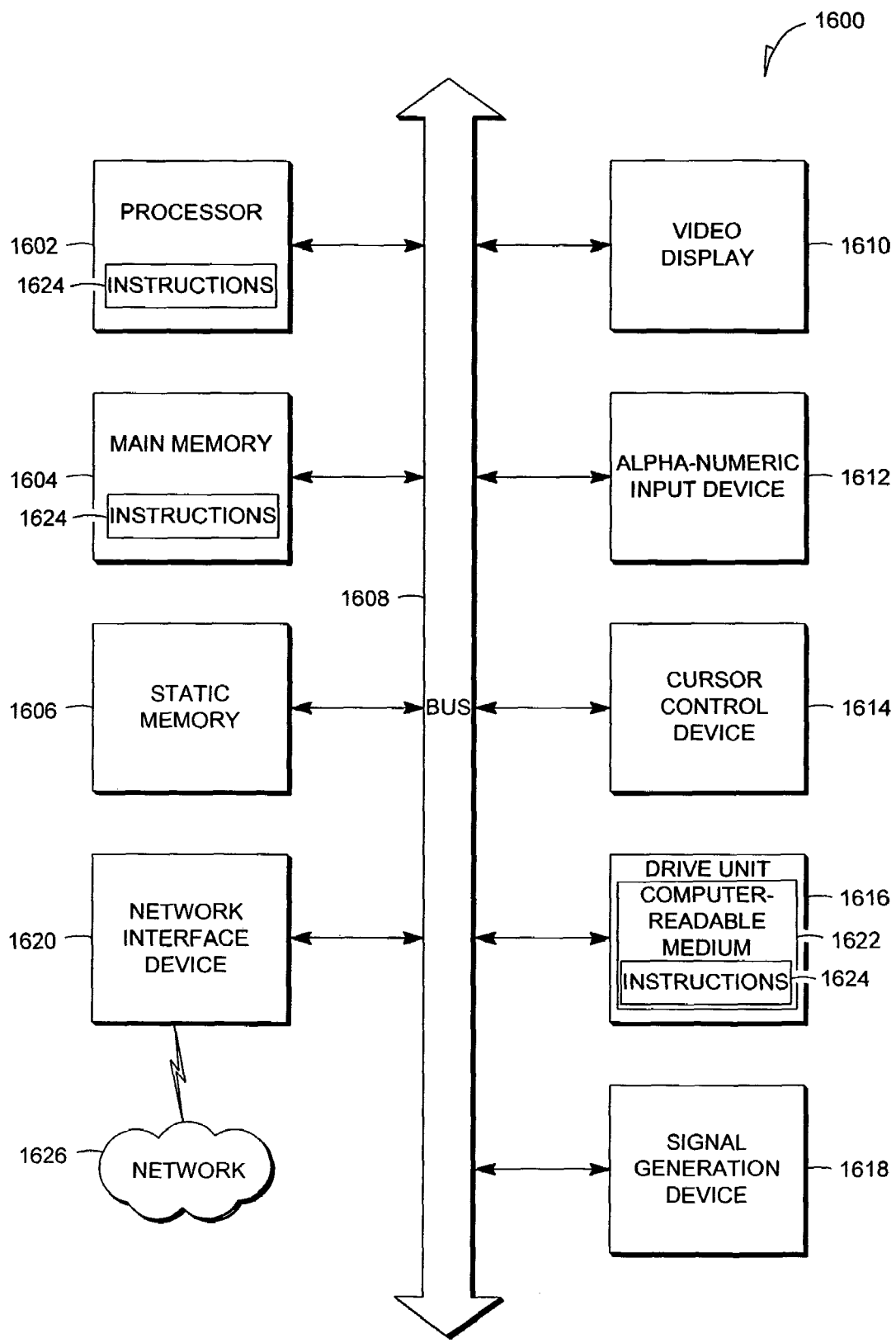
FIG. 16 illustrates a diagrammatic representation of machine in the example form of a computer system within which a set of instructions, for causing the machine to perform any one or more of the methodologies discussed herein, may be executed.

FIG. 16 shows a diagrammatic representation of machine in the form of a computer system 1600 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a portable music player (e.g., a portable hard drive audio device such as an MP3 player), a car audio device, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1600 includes a processor 1602 (e.g., a central processing unit (CPU) a graphics processing unit (GPU) or both), a main memory 1604 and a static memory 1606, which communicate with each other via a bus 1608. The processor 1602 may represent a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. The processor 1602 may execute instructions and includes that portion of the computer system 1600 that controls the operation of the entire computer system 1600.

The computer system 1600 may further include a video display unit 1610 (e.g., a liquid crystal display (LCD) or a cathode ray tube (CRT)). The computer system 1600 also includes an alphanumeric input device 1612 (e.g., a keyboard), a cursor control device 1614 (e.g., a mouse), a disk drive unit 1616, a signal generation device 1618 (e.g., a speaker) and a network interface device 1620.

The cursor control device 1614 may be a keyboard, mouse or other pointing device, trackball, touchpad, touch screen, keypad, microphone, voice recognition device, or any other appropriate mechanism for the user to input data to the computer 1600 and manipulate the user interface previously discussed. Although only one input device 1614 is shown, in another embodiment any number and type of input devices may be present.

The disk drive unit 1616 includes a machine-readable medium 1622 on which is stored one or more sets of instructions (e.g., software 1624) embodying any one or more of the methodologies or functions described herein. The software 1624 may also reside, completely or at least partially, within the main memory 1604 and/or within the processor 1602 during execution thereof by the computer system 1600, the main memory 1604 and the processor 1602 also constituting machine-readable media.

The software 1624 may further be transmitted or received over a network 1626 via the network interface device 1620. The network 1626 may be any suitable network and may support any appropriate protocol suitable for communication to the computer system 1600. In an embodiment, the network 1626 may support wireless communications. In another embodiment, the network 1626 may support hard-wired communications, such as a telephone line or cable. In another embodiment, the network 1626 may support the Ethernet IEEE (Institute of Electrical and Electronics Engineers) 802.3x specification. In another embodiment, the network 1626 may be the Internet and may support IP (Internet Protocol). In another embodiment, the network 1626 may be a local area network (LAN) or a wide area network (WAN). In another embodiment, the network 1626 may be a hotspot service provider network. In another embodiment, the network 1626 may be an intranet. In another embodiment, the network 1626 may be a GPRS (General Packet Radio Service) network. In another embodiment, the network 1626 may be any appropriate cellular data network or cell-based radio network technology. In another embodiment, the network 1626 may be an IEEE 802.11 wireless network. In still another embodiment, the network 1626 may be any suitable network or combination of networks. Although one network 1626 is shown, in other embodiments any number of networks (of the same or different types) may be present.

While the machine-readable medium 1622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

The computer system 1600 may be implemented using any suitable hardware and/or software, such as a personal computer or other electronic computing device. Portable computers, laptop or notebook computers, PDAs (Personal Digital Assistants), pocket computers, appliances, telephones, and mainframe computers are examples of other possible configurations of the computer system 1600. For example, other peripheral devices such as audio adapters or chip programming devices, such as EPROM (Erasable Programmable Read-Only Memory) programming devices may be used in addition to, or in place of, the hardware already depicted.

Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

The embodiments described herein may be implemented in an operating environment comprising software installed on any programmable device, in hardware, or in a combination of software and hardware.

Although embodiments have been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method for performing an adjustment to an overall financial goal based on military benefits comprising:
   using one or more processors to execute instructions retained in machine-readable medium to perform at least some portion of the following
   accessing an insurance amount associated with an overall financial goal;
   processing an active duty military adjustment to the insurance amount when a user is serving on active duty and is not serving as a guard officer or a reserve officer;
   processing a guard/reserves adjustment to the insurance amount when the user is serving on active duty and is serving as a guard officer or a reserve officer;
   processing a retired active duty adjustment to the insurance amount when the user is retired military and did not serve as a guard officer or a reserve officer; and
   processing a retired guard/reserves adjustment to the insurance amount when the user is retired military and served as a guard officer or a reserve officer.

2. The method of claim 1, wherein the processing the active duty military adjustment to the insurance amount is performed by:
   determining whether the user while retire;
   selectively determining a number of years of service at retirement;
   selectively calculating a retirement pension based on the number of years of service at retirement; and
   offsetting an insurance amount for the user by the calculated retirement pension if the user will retire.

3. The method of claim 2, wherein the processing the active duty military adjustment to the insurance amount is further performed by:
   selectively determining a survivorship benefit for a spouse of the user; and
   selectively reducing a spouse insurance amount by the survivorship benefit if the user will retire.

4. The method of claim 1, wherein the processing the guard/reserves adjustment to the insurance amount is performed by:
   determining whether the user while retire;
   selectively determining a number of years of service at retirement;
   determining a retirement pay grade of the user;
   selectively calculating a retirement pension based on the retirement pay grade and a number of years of service at retirement; and
   offsetting an insurance amount for the user by the calculated retirement pension if the user will retire.

5. The method of claim 4, wherein the processing the guard/reserves adjustment to the insurance amount is further performed by:
   determining whether the user will meet a service term at retirement;
selectively determining a survivorship benefit for a spouse of the user; and
   selectively reducing a spouse insurance amount by the survivorship benefit if the user will retire and the service term will be met at retirement.

6. The method of claim 1, wherein the processing the retired active duty military adjustment to the insurance amount is performed by:
   calculating a retirement pension of the user;
   offsetting an insurance amount for the user by the calculated retirement pension;
   selectively calculating survivor benefit plan (SBP) benefits and offsetting an insurance amount by the SBP benefits when the user has a spouse that is covered by a survivor benefit.

7. The method of claim 1, wherein the processing the retired guard/reserves adjustment to the insurance amount is performed by:
   determining years of service at retirement;
   determining a retirement pay grade;
   calculating a retirement pension using the years of service at retirement and the retirement pay grade;
   offsetting an insurance amount for the user by the calculated retirement pension; and
   selectively determining a survivorship benefit amount of a spouse and reducing a spouse insurance amount by the survivorship benefit amount when the user has a spouse that is covered by a survivor benefit.

8. A machine-readable medium for performing an adjustment to an overall financial goal based on military benefits comprising instructions, which when executed by a machine, cause the machine to:

use one or more processors to execute instructions retained in machine-readable medium to perform at least some portion of the following access an insurance amount associated with an overall financial goal;

process an active duty military adjustment to an the insurance amount when a user is serving on active duty and is not serving as a guard officer or a reserve officer;

process a guard/reserves adjustment to the insurance amount when the user is serving on active duty and is serving as a guard officer or a reserve officer;

process a retired active duty adjustment to the insurance amount when the user is retired military and did not serve as a guard officer or a reserve officer; and process a retired guard/reserves adjustment to the insurance amount when the user is retired military and served as a guard officer or a reserve officer.

9. A machine-readable medium of claim 8 further comprising instructions, which when executed by a machine, cause the machine to:

determine whether the user while retire;

selectively determine a number of years of service at retirement;

selectively calculate a retirement pension based on the number of years of service at retirement; and offset an insurance amount for the user by the calculated retirement pension if the user will retire.

10. A machine-readable medium of claim 9 further comprising instructions, which when executed by a machine, cause the machine to:

selectively determine a survivorship benefit for a spouse of the user; and selectively reduce a spouse insurance amount by the survivorship benefit if the user will retire.

11. A machine-readable medium of claim 8 further comprising instructions, which when executed by a machine, cause the machine to:

determine whether the user while retire;

selectively determine a number of years of service at retirement;

determine a retirement pay grade of the user;

selectively calculate a retirement pension based on the retirement pay grade and a number of years of service at retirement; and offset an insurance amount for the user by the calculated retirement pension if the user will retire.

12. A machine-readable medium of claim 11 further comprising instructions, which when executed by a machine, cause the machine to:

determine whether the user will meet a service term at retirement;

selectively determine a survivorship benefit for a spouse of the user; and selectively reduce a spouse insurance amount by the survivorship benefit if the user will retire and the service term will be met at retirement.

13. A machine-readable medium of claim 8 further comprising instructions, which when executed by a machine, cause the machine to:

calculate a retirement pension of the user;

offset an insurance amount for the user by the calculated retirement pension;

selectively calculate survivor benefit plan (SBP) benefits and offsetting an insurance amount by the SBP benefits when the user has a spouse that is covered by a survivor benefit.

14. A machine-readable medium of claim 8 further comprising instructions, which when executed by a machine, cause the machine to:

determine years of service at retirement;

determine a retirement pay grade;

calculate a retirement pension using the years of service at retirement and the retirement pay grade;

offset an insurance amount for the user by the calculated retirement pension; and selectively determine a survivorship benefit amount of a spouse and reducing a spouse insurance amount by the survivorship benefit amount when the user has a spouse that is covered by a survivor benefit.

15. A system for performing an adjustment to an overall financial goal based on military benefits, the system comprising at least one subsystem for:

using one or more processors to execute instructions retained in at least one subsystem to perform at least some portion of the following accessing an insurance amount associated with an overall financial goal;

processing an active duty military adjustment to the insurance amount when a user is serving on active duty and is not serving as a guard officer or a reserve officer;

processing a guard/reserves adjustment to the insurance amount when the user is serving on active duty and is serving as a guard officer or a reserve officer;

processing a retired active duty adjustment to the insurance amount when the user is retired military and did not serve as a guard officer or a reserve officer; and processing a retired guard/reserves adjustment to the insurance amount when the user is retired military and served as a guard officer or a reserve officer.

16. The system of claim 15, wherein the at least one subsystem further comprises:

determining whether the user while retire;

selectively determining a number of years of service at retirement;

selectively calculating a retirement pension based on the number of years of service at retirement; and offsetting an insurance amount for the user by the calculated retirement pension if the user will retire.

17. The system of claim 16, wherein the at least one subsystem further comprises:

selectively determining a survivorship benefit for a spouse of the user; and selectively reducing a spouse insurance amount by the survivorship benefit if the user will retire.

18. The system of claim 15, wherein the at least one subsystem further comprises:

determining whether the user while retire;

selectively determining a number of years of service at retirement;

determining a retirement pay grade of the user;

selectively calculating a retirement pension based on the retirement pay grade and a number of years of service at retirement; and offsetting an insurance amount for the user by the calculated retirement pension if the user will retire.

19. The system of claim 18, wherein the at least one subsystem further comprises:

determining whether the user will meet a service term at retirement;

selectively determining a survivorship benefit for a spouse of the user; and selectively reducing a spouse insurance amount by the survivorship benefit if the user will retire and the service term will be met at retirement.

20. The system of claim 15, wherein the at least one subsystem further comprises:
   calculating a retirement pension of the user;
   offsetting an insurance amount for the user by the calculated retirement pension;
   selectively calculating survivor benefit plan (SBP) benefits and offsetting an insurance amount by the SBP benefits when the user has a spouse that is covered by a survivor benefit.

21. The system of claim 15, wherein the at least one subsystem further comprises:
   determining years of service at retirement;
   determining a retirement pay grade;
   calculating a retirement pension using the years of service at retirement and the retirement pay grade;
   offsetting an insurance amount for the user by the calculated retirement pension; and
   selectively determining a survivorship benefit amount of a spouse and reducing a spouse insurance amount by the survivorship benefit amount when the user has a spouse that is covered by a survivor benefit.

* * * * *